(12) United States Patent
Baerentz

(10) Patent No.: US 11,870,258 B2
(45) Date of Patent: Jan. 9, 2024

(54) POWER CONTROL FOR A CONTAINER VESSEL

(71) Applicant: Maersk Line A/S, København K (DK)

(72) Inventor: Morten Rene Baerentz, Liseleje (DK)

(73) Assignee: Maersk Line A/S, København K (DK)

( * ) Notice: Subject to any disclaimer, the term of this patent is extended or adjusted under 35 U.S.C. 154(b) by 117 days.

(21) Appl. No.: 17/566,392

(22) Filed: Dec. 30, 2021

(65) Prior Publication Data
US 2022/0121159 A1    Apr. 21, 2022

Related U.S. Application Data

(63) Continuation of application No. PCT/EP2020/069461, filed on Jul. 9, 2020.

(30) Foreign Application Priority Data

Jul. 10, 2019 (GB) .................................. 1909934

(51) Int. Cl.
*H02J 3/14* (2006.01)
*F25D 1/00* (2006.01)
(Continued)

(52) U.S. Cl.
CPC .............. *H02J 3/14* (2013.01); *B65D 88/745* (2013.01); *B65D 90/00* (2013.01); *F25D 11/003* (2013.01); *G05B 13/02* (2013.01); *H02J 3/144* (2020.01)

(58) Field of Classification Search
CPC ....... G05B 13/02; B65D 90/00; F25D 11/003; H02J 2310/42; H02J 3/14; H02J 3/144; B63J 3/04; B63J 2003/002
See application file for complete search history.

(56) References Cited

U.S. PATENT DOCUMENTS 4,268,787 A    5/1981   Sloan
6,191,500 B1 * 2/2001   Toy .......................... H02J 3/46
                                                         307/64
(Continued)

FOREIGN PATENT DOCUMENTS

CN      109995182 A    7/2019
EP      2886442 B1    10/2018
(Continued)

OTHER PUBLICATIONS

United Kingdom Search Report dated Jan. 13, 2020 for GB Application No. GB1909934.0.
(Continued)

*Primary Examiner* — Pedro J Cuevas
(74) *Attorney, Agent, or Firm* — EIP US LLP

(57) ABSTRACT

Disclosed is a power control system for a container vessel. The power control system has a power interface for supplying energy to at least one reefer container transportable by the container vessel. The power control system also has a controller configured to obtain load data representative of a load on a generator of the container vessel, and target load range data representative of a target load range for the generator. The power control system is configured to control the load such that the load falls within the target load range by the controller increasing energy supplied to the power interface for storage at the at least one reefer container, when the load is below the target load range.

20 Claims, 9 Drawing Sheets

(51) Int. Cl.
B65D 88/74 (2006.01)
B65D 90/00 (2006.01)
G05B 13/02 (2006.01)
F25D 11/00 (2006.01)

(56) References Cited

U.S. PATENT DOCUMENTS

| | | | |
|---|---|---|---|
| 6,652,330 B1 * | 11/2003 | Wasilewski | H02J 1/14 |
| | | | 440/2 |
| 10,826,293 B1 * | 11/2020 | Metcalf | H02J 7/143 |
| 11,034,213 B2 * | 6/2021 | Wenger | B60H 1/00364 |
| 11,072,321 B2 * | 7/2021 | Wenger | B60H 1/00771 |
| 11,420,495 B2 * | 8/2022 | Schumacher | H04L 67/12 |
| 11,458,802 B2 * | 10/2022 | Andrade Dias | H02J 7/0068 |
| 11,695,275 B2 * | 7/2023 | Schumacher | B60H 1/3232 |
| | | | 62/239 |
| 2004/0020236 A1 | 2/2004 | Vince et al. | |
| 2014/0343741 A1 * | 11/2014 | Clarke | F25D 11/003 |
| | | | 700/291 |
| 2022/0118815 A1 * | 4/2022 | Baerentz | B60H 1/0073 |

FOREIGN PATENT DOCUMENTS

| | | |
|---|---|---|
| JP | S61256167 A | 11/1986 |
| JP | 2010141998 A | 6/2010 |
| JP | 2011149685 A | 8/2011 |
| JP | 2014153022 A | 8/2014 |
| JP | 2014228165 A | 12/2014 |
| JP | 2019093735 A | 6/2019 |
| KR | 20170053740 A | 5/2017 |
| KR | 1020190048822 A | 5/2019 |
| WO | 2012107977 A1 | 8/2012 |
| WO | 2012175624 A1 | 12/2012 |
| WO | 2013077495 A1 | 5/2013 |
| WO | 2013139640 A1 | 9/2013 |
| WO | 2014125766 A1 | 8/2014 |
| WO | 2017125359 A1 | 7/2017 |
| WO | 2018005968 A1 | 1/2018 |

OTHER PUBLICATIONS

International Search Report and Written Opinion dated Oct. 9, 2020 for PCT Application No. PCT/EP2020/069461.
United Kingdom Combined Search and Examination report dated Jan. 7, 2020 for GB Application No. GB1909935.7.
International Search Report and Written Opinion dated Oct. 12, 2020 for PCT Application No. PCT/EP2020/069462.

* cited by examiner

POWER CONTROL FOR A CONTAINER VESSEL

CROSS-REFERENCE TO RELATED APPLICATIONS

This application is a continuation of International Application No. PCT/EP2020/069461, filed Jul. 9, 2020, which claims priority to United Kingdom Application No. GB 1909934.0 filed Jul. 10, 2019, under 35 U.S.C. § 119(a). Each of the above-referenced patent applications is incorporated by reference in its entirety.

BACKGROUND OF THE INVENTION

Field of the Invention

The present invention relates to a power controller and a power control system for a container vessel and an associated method.

Description of the Related Technology

Container vessels play an important role in transporting cargo around the world. A container vessel will typically have an onboard generator, also called an "engine-generator set" or a "gen-set", which may be used to provide electrical power to components of the container vessel. The generator may include an electrical generator combined with an engine. For example, a diesel generator may be a combination of a diesel engine with an electric generator (e.g. an alternator) together operable to generate electrical energy. The generated electrical energy is typically supplied to a vessel component, via a combination of an electric current and an electric potential, by an electrical circuit (e.g. an electric power system or utility) onboard the vessel. Electric power is then a rate, per unit time, at which the electrical energy is transferred by the electric circuit to the component. The SI unit of power is the watt (W), equivalent to one joule per second, however electric power supply is typically measured by the kilowatt hour (kWh) which is the product of the electric power in kilowatts and a running time of the supply in hours. The kilowatt hour is thus a unit of energy and is equivalent to 3.6 mega joules (MJ) in SI units.

The container vessel components powered by the generator can include thrusters, e.g. comprising propellers laterally mounted on the container vessel that can suck or blow water to manoeuvre the container vessel. The container vessel may have onboard pumps, e.g. marine pumps, for displacing fluid which may also be electrically powered via the generator. There may also be a "hotel load" on the generator, e.g. power demanded by systems required by crew on the vessel, such as lighting, heating, galley appliances, and the like.

The electric power demands on a given container vessel generator may thus vary significantly over time, given the various powered components onboard and their respective power requirements. It may therefore be difficult to manage the demands placed on a given generator, and there is thus a desire to improve electric power management for container vessels that use generators to power vessel components.

SUMMARY

A first aspect of the present invention provides a power control system for a container vessel, the power control system comprising:

a power interface for supplying energy to at least one reefer container transportable by the container vessel;
a controller configured to obtain:
  load data representative of a load on a generator of the container vessel; and
  target load data representative of a target load range for the generator;
wherein the power control system is configured to control the load such that the load falls within the target load range by the controller increasing energy supplied to the power interface for storage at the at least one reefer container, when the load is below the target load range.

Controlling the load on the generator within the target load range may improve an efficiency of the generator. For example, an amount of fuel oil required by the generator to generate a given amount of energy (e.g. one kilowatt hour) may be at a minimum when the generator is operating at a specific load (e.g. a target load) or load range within the target load range. Thus, by controlling the generator load within the target load range (which may be considered as "load smoothing") the operating efficiency of the generator may be improved. Accordingly, the generator load smoothing may help to reduce fuel consumption of the generator, and container vessel, in turn reducing pollution levels.

Optionally, the controller increasing the energy supplied to the power interface for storage at the at least one reefer container is to cool the at least one reefer container below a set temperature for the at least one reefer container.

Optionally, the controller increasing the energy supplied to the power interface for storage at the at least one reefer container is to cool the at least one reefer container by at least 5 degrees Celsius, optionally to a temperature of no less than −35 degrees Celsius. In some cases, this is to cool the at least one reefer container by at least 5 degrees Celsius below the set temperature for the at least one reefer container.

Optionally, the power control system is configured to control the load such that the load falls within the target load range by the controller reducing energy supplied to the at least one reefer container, via the power interface, when the load is above the target load range.

Optionally, reducing the energy supplied to the at least one reefer container comprises stopping a supply of energy to the at least one reefer container.

Optionally, the power control system comprises a plurality of power interfaces, including the power interface, for supplying energy to a plurality of respective reefer containers.

Optionally, the load on the generator includes a reefer load comprising energy supplied to the plurality of reefer containers via the plurality of power interfaces, and the power control system is configured to control the load such that the load falls within the target load range by the controller adjusting the reefer load when the load is outside the target load range.

Optionally, the controller is configured to select one or more reefer containers from the plurality of reefer containers for adjusting the energy supplied thereto, via one or more power interfaces of the plurality of power interfaces. The adjusting the energy supplied may comprise increasing the energy supplied, e.g. when the load is below the target load range, and/or decreasing the energy supplied, e.g. when the load is above the target load range.

Optionally, the controller is configured to select the one or more reefer containers based on at least one of the following criteria, relative to other reefer containers in the plurality of reefer containers:

a respective location on the container vessel of the one or more reefers;

a type of product contained within the one or more reefer containers;

a model type of the one or more reefer containers;

an amount of energy being supplied to the one or more reefer containers;

a current internal temperature of the one or more reefer containers;

a coefficient of performance of the one or more reefer containers; and an external air temperature at the location on the container vessel of the one or more reefer containers.

A second aspect of the present invention provides a power distribution system comprising: the power control system according to the first aspect; and the generator.

A third aspect of the present invention provides a container vessel comprising: the power control system according to the first aspect; or the power distribution system according to the second aspect.

A fourth aspect of the present invention provides a power controller for a container vessel, configured to obtain:

load data representative of a load on a generator of the container vessel; and target range data representative of a target load range for the generator;

wherein the controller is configured to control the load such that the load falls within the target load range by:

determining when the load is below the target load range; and based on the determining, increasing an amount of energy supplied to a power interface, for supplying energy to at least one reefer container of the container vessel, for storage at the at least one reefer container.

Optionally, the power controller increasing the amount of energy supplied to the power interface for storage at the at least one reefer container is to cool the at least one reefer container below a set temperature for the at least one reefer container.

Optionally, the power controller is configured to control the load such that the load falls within the target load range by causing a reduction in energy supplied to the at least one reefer container via the power interface when the load is above the target load range.

A fifth aspect of the present invention provides a method for operating a power control system of a container vessel, the method comprising:

obtaining load data representative of a load on a generator of the container vessel;

obtaining target load range data representative of a target load range for the generator; and when the load is below the target load range, controlling the load such that the load falls within the target load range by increasing energy supplied to a reefer container transportable by the container vessel, for storage at the reefer container.

Optionally, increasing the energy supplied to the reefer container is to cool the reefer container below a set temperature for the reefer container.

Optionally, increasing the energy supplied to the reefer container is to cool the reefer container by at least 5 degrees Celsius, optionally to a temperature of no less than −35 degrees Celsius. In some cases, this is to cool the reefer container by at least 5 degrees Celsius below the set temperature for the reefer container.

Optionally, the method comprises controlling the load such that the load falls within the target load range by reducing energy supplied to the reefer container, when the load is above the target load range.

Optionally, the reducing the energy supplied to the reefer container comprises stopping a supply of energy to the reefer container.

Optionally, the method comprises controlling the load such that the load falls within the target load range by increasing, when the load is below the target load range, energy supplied to a plurality of reefer containers, comprising the reefer container, for storage at the plurality of reefer containers.

Optionally, the load on the generator includes a reefer load comprising energy supplied to the plurality of reefer containers, and the method comprises controlling the load such that the load falls within the target load range by adjusting the reefer load when the load is outside the target load range.

Optionally, the method comprises selecting one or more reefer containers, from the plurality of reefer containers, for adjusting the energy supplied thereto. The adjusting the energy supplied may comprise increasing the energy supplied, e.g. when the load is below the target load range, and/or decreasing the energy supplied, e.g. when the load is above the target load range.

Optionally, the method comprises selecting the one or more reefer containers based on at least one of the following criteria, relative to other reefer containers of the plurality of reefer containers:

a respective location on the container vessel of the one or more reefer containers;

a type of product contained within the one or more reefer containers;

a model type of the one or more reefer containers;

a current amount of energy being supplied to the one or more reefer containers;

a current internal temperature of the one or more reefer containers;

a coefficient of performance of the one or more reefer containers; and an external air temperature at the location on the container vessel of the one or more reefer containers.

BRIEF DESCRIPTION OF THE DRAWINGS

Embodiments of the invention will now be described, by way of example only, with reference to the accompanying drawings, in which.

DETAILED DESCRIPTION

Figure 1:
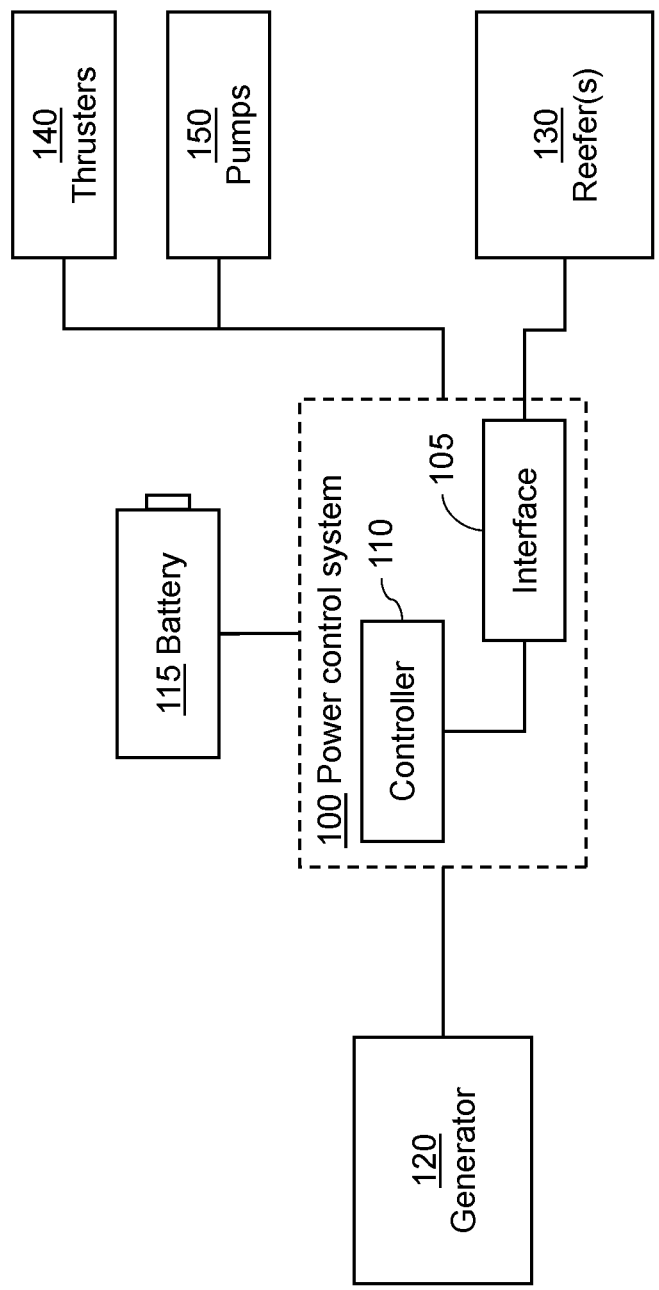
FIGS. 1 and 2 show schematic views of a power control system for a marine vessel according to examples.

Certain examples described herein provide methods and systems to control a load on a container vessel generator such that it falls within a target load range. By smoothing up- and down-surges in the generator load, fuel usage of the generator can be reduced, in a similar way to cruise control for a motor vehicle. By specifically controlling the load on the generator such that the load falls within a target load range (e.g. which includes a target load for the generator), as provided for by examples described herein, an operating efficiency of the generator can be improved. This may further help to reduce fuel consumption of the generator, and the container vessel, in turn reducing pollution levels.

Reefer containers, also known as refrigerated containers or simply "reefers", may be used to transport temperature-sensitive goods such as food (e.g. poultry, fish, meat, etc.), plants, medicines, batteries, etc. A reefer may comprise an integral refrigeration unit for refrigerating the container, and be powered from an external power source, such as an electrical power point (e.g. "reefer point") on the container vessel. The container vessel may have plurality of containers loaded onboard, of which some may be reefers.

One or more reefer containers onboard the container vessel can be utilised as a thermo-energy store, enabling the generator load to be controlled, e.g. maintained, within the predetermined target load range. For example, the reefer containers may be held separately to specific energy storage facilities, such as batteries, which may be available to the power supply system onboard the container vessel. Routing energy for storage at the reefer containers during periods of lower demand on the generator means that the reefer containers may be run at a lower load during periods of higher demand on the generator, e.g. thereby utilising the reefer containers as a thermo-battery, and in turn allowing for the generator load to be controlled such that it can be better maintained within the target load range, leading to the benefits outlined above.

Certain examples described herein utilise reefers for storing energy generated by the generator, so that the generator load can be smoothed and controlled such that the load falls within the target load range. Storing energy at the reefers may involve reducing a temperature of the internal refrigeration space of a reefer below a set temperature for the reefer (sometimes called "sub-cooling" the reefer) which enables the generator load to be controlled while allowing the reefers to be temperature controlled such that products stored within the reefers are not spoiled. For example, in a temperature-controlled supply chain (also knowns as a "cold chain" or "cool chain"), certain products may require being maintained within a specified temperature range. The set temperature for the at least one reefer container carrying such cargo may thus correspond to the specified temperature range, which may be below freezing, e.g. for meat, fish, and other frozen foodstuff. Thus, in certain cases, the operating temperature of the reefer containing such cargo can be reduced while still maintaining the required temperature control for the cargo, which allows for the described advantages in smoothing the generator load within the target load range while not negatively affecting the cargo.

Figure 7:
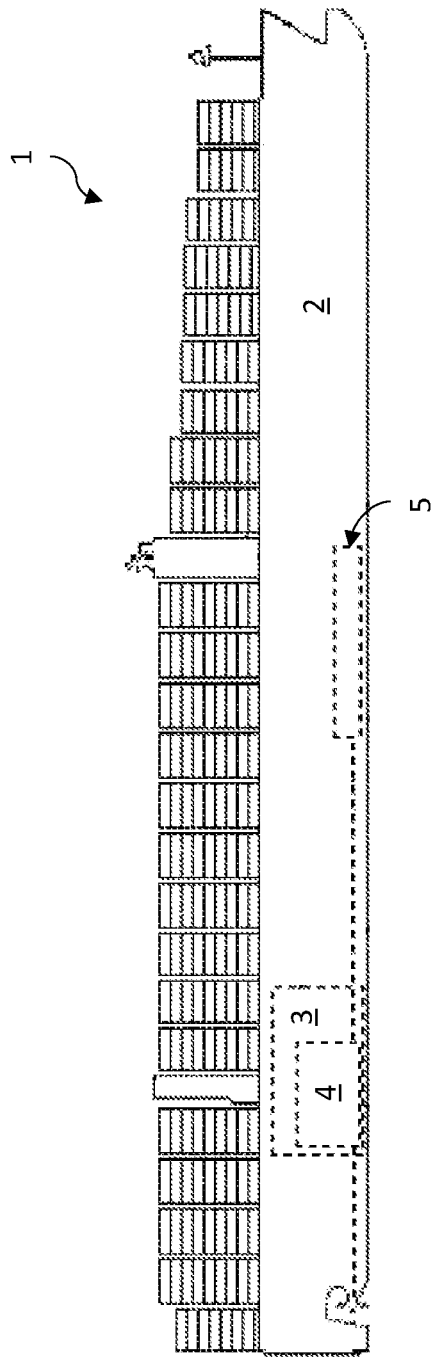
FIG. 7 shows a schematic view of a marine vessel according to examples.

FIG. 1 shows an example of a power control system 100 for a container vessel (such as that shown in FIG. 7). The container vessel 1 of FIG. 7 has a hull 2 and one or more engine rooms 3 inside the hull 2. The container vessel 1 is powered by one or more large internal combustion engines 4, such as four-stroke or two-stroke self-igniting combustion engines 4, located in the engine room 3. The engine(s) 4 drive(s) a propulsion mechanism (such as one or more propellers). The vessel 1 also comprises a fuel system 5 for supplying fuel to the engine(s) 4. The power control system 100 of FIG. 1 comprises a power interface 105 for supplying energy to at least one reefer container 130 transportable by the container vessel 1. For example, the power interface 105 may comprise an electrical power point for supplying power to the at least one reefer container 130. The power control system 100 also includes a controller 110, e.g. a power controller for the container vessel 1. The controller 110 may be implemented as part of the power control system 100 located on the container vessel 1. In other cases, the controller 110 may be located remotely from the container vessel 1 and configured to communicate with the container vessel 1, e.g. to receive and send data from and to the container vessel 1, respectively. For example, in cases where the controller 110 is located remotely from the container vessel 1, the controller 110 may communicate with components on the container vessel 1, e.g. an onboard sub-controller and/or other components of the power control system 100, via respective communication interfaces at the container vessel 1 and at the remote location of the controller 110. The remote location may, for example, be on the shore, such as at a container terminal or at a logistics company headquarters, or on another vessel.

The controller 110 may, in certain cases, be configured to obtain capacity data representative of a maximum load capacity of a generator 120. To obtain data may be to receive or retrieve the data, e.g. via a wired or wireless communications channel, from a source. In other cases, to obtain data may be to determine the data, e.g. to compute the data at the controller 110. In some cases, to obtain given data may be to both receive or retrieve initial data from a source, e.g. from another component internal or external to the power control system 100, and to then determine the given data based on the received/retrieved initial data. For example, the controller 110 may receive input data, e.g. information relating to the generator 120 such as one or more characteristics thereof, and then determine the capacity data based on the input data. The determination may involve computation and/or a lookup in a database, for example. The controller 110 may also be configured to obtain cargo data, e.g. from a cargo database, and/or reefer data, e.g. comprising information relating to a current status of one or more reefer containers, in examples.

The generator 120, also called an "engine-generator set" or a "gen-set", may include an electrical generator combined with an engine (e.g. a prime mover). For example, the generator 120 may comprise a diesel generator—a combination of a diesel engine with an electric generator (e.g. an alternator)—to generate electrical energy. The generator 120 may be used to provide electrical power to components of the container vessel 1, for example thrusters 140 which may be operated by electric motors controlled from a bridge on the container vessel 1. The thrusters 140 may include propellers, laterally mounted on the container vessel 1, that can suck or blow water from port to starboard (i.e. left to right) or vice versa. The thrusters 140 may thus be used in manoeuvring the container vessel 1, e.g. during docking operations. Pumps 150 on the container vessel 1, e.g. container pumps, may also be electrically powered via the generator 120. For example, the pumps 150 may be driven by one or more electric motors to transport or displace fluid, the electric motor(s) being supplied electrical energy generated by the generator 120. The generator 120 may also be used to provide electrical power to systems required by crew on the vessel, such as lighting, heating, galley appliances, and the like, which can comprise a "hotel load" on the generator 120.

The controller 110, e.g. as part of the power control system 100 for the container vessel 1, is configured to obtain load data representative of a load on the generator 120. The load on the generator 120 may be the total power output of the generator 120, e.g. at a given time or over a given time period. The load data may thus be representative of a power value, or a timeseries of power values, e.g. in units of watts (W) or kilowatts (kW). For example, the generator 120 may have a maximum load capacity, represented by a given power value (or "wattage"), which is the maximum amount of electrical power that can be supplied by the generator 120. At any given time, the generator 120 may thus be operating at a load between zero (0 W) and its maximum load capacity.

The controller 110 is also configured to obtain target load data representative of a target load range for the generator. In some examples, the controller 110 is part of a Power Management System (PMS) which may comprise an Energy Management System (EMS). For example, the power control system 100 for the container vessel 1 may form or be part of the PMS and/or EMS. In some examples, one purpose of the PMS and/or EMS is to ensure there is always power available for the safe operation of the container vessel 1. The PMS may start and stop one or more generators 120 and/or disconnect less important loads to ensure power for important loads in a critical situation, for example. To reach a more effective way of operating the vessel, the EMS can optimise the load condition of the one or more running generators 120 in combination with energy storage devices like batteries. In examples, the target load range may encompass a target load for the generator 120. The target load may be a predetermined power value that the generator 120 is intended to operate at. For example, the target load may be an absolute power value, e.g. a specific wattage, such as 500 kW. Alternatively, the target load may be expressed relative to the maximum load capacity of the generator 120, e.g. as a fraction or percentage of the maximum load capacity. In an example, the target load may be a load percentage of 85% of the maximum load capacity of the generator 120. Other load percentages, such as falling within a range 70% to 90%, may apply in some other examples. In certain cases, the target load range may be based on an efficiency of the generator 120, or specifically of the engine of the generator 120. For example, the target load range may be determined, or predetermined, to be a load range on the generator 120 that provides a peak efficiency of the generator 120 (or specifically the engine component thereof). It may be determined that the generator 120 may operate most efficiently at a load percentage (such as 85%) or load percentage range (such as 80% to 90%) of the maximum load capacity of the generator 120, for example. The specific load percentage (range) may be determined as a most effective load condition on the generator 120 (or engine component thereof), for example, to provide a load condition that is optimised, e.g. by the EMS as described above.

The efficiency of the generator 120 may correspond to a ratio between power available at the generator output and energy supplied at the generator input. The power available at output of the generator 120 may be a net electrical power, e.g. after all losses such as core, copper and mechanical losses. The input to the generator 120 may be a mechanical input, e.g. acquired by turbine blades, driven by an energy source, e.g. fuel such as marine grade diesel or heavy fuel oil. The efficiency of the generator 120 may thus be based on an efficiency of an engine of the generator 120. The efficiency of the engine may correspond to a specific fuel oil consumption of the engine, i.e. a mass of fuel consumed by the engine per unit energy, which may be represented in units of kilogram per kilowatt-hour (kg/kWh) or grams per brake horse power per hour (g/bhp·h) for example. Thus, a maximum or peak efficiency of an engine may correspond to a minimum specific fuel oil consumption for the engine. In certain cases, the target load of the generator 120 may correspond with the minimum specific fuel oil consumption of the engine part of the generator 120.

Figure 3A:
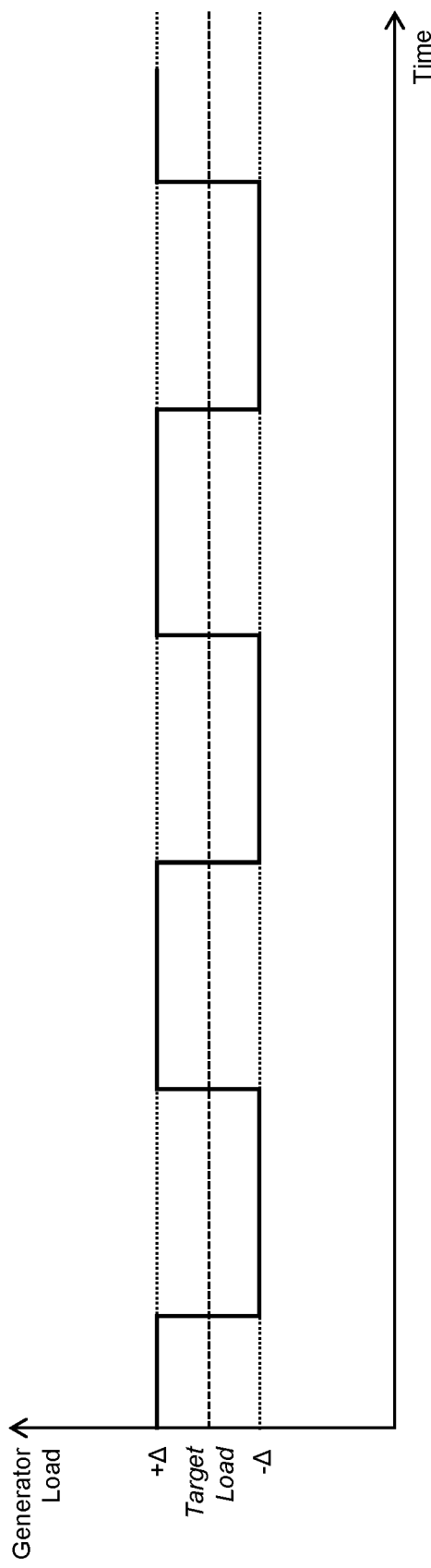
FIGS. 3A and 3B show charts illustrating an example of managing a load on a generator.

The power control system 100, or at least the controller 110 thereof, is configured to control the load on the generator 120 such that the load falls within the target load range, e.g. which includes the target load. For example, the predetermined range may correspond to a predetermined range of load values, or percentage load values, either side of the target load value. FIG. 3A shows an example where the target load comprises a predetermined load value, e.g. 85% of the maximum load capacity of the generator load. The power control system is configured to control, e.g. maintain, the generator load such that it falls within a predetermined range of the target load value $\pm \Delta$, where $\Delta$ is a predetermined load value defining the ends of the range. For example, $\Delta$ may be an absolute power value such as 10 kW. Alternatively, $\Delta$ may be a load percentage (e.g. 5%) of the maximum load capacity of the generator 120. In another example, $\Delta$ may be a percentage (e.g. 10%) of the target load value (e.g. if the target load were 450 kW the target load range would be 450 kW±45 kW, i.e. from 405 kW to 495 kW which includes the target load value of 450 kW). In some examples, the target load range may be asymmetric about the target load value. For instance, given a target load value of L, the power control system may be configured to control the generator load such that it falls within a predetermined range: $\Delta_1 \leq L \leq \Delta_2$; where $\Delta_1$ and $\Delta_2$ are different values. In some cases, the target load range for the generator may be based on a predicted load for the generator, e.g. at a future time.

The power control system 100, or at least the controller 110 thereof, is configured to control the load on the generator 120 such that it falls within the target load range by the controller 110 increasing energy supplied to the power interface 105 for storage at the at least one reefer container 130, when the load is below the target load range. For example, given the target load range of 405 kW to 495 kW, which includes the target load value of 450 kW, when the load on the generator 120 is below 405 kW the controller 110 may increase, e.g. by the difference in energy between the actual load on the generator 120 and the lower bound of the target load range, the energy supplied to the power interface 105 for storage at the at least one reefer container 130. In some cases, this increase of the amount of energy supplied to the power interface 105 may be from zero, e.g. from no energy being supplied to the power interface 105. The at least one reefer container 130 may thus effectively be utilised as a thermo-energy store. For example, when the generator 120 is operating at a load below the target load range, the at least one reefer container 130 may be actively cooled below a set temperature for the at least one reefer container 130 by the controller 110 increasing the energy supplied to power the respective refrigeration unit of the at least one reefer container 130. Such "sub-cooling" of the at least one reefer container 130 involves the generator 120 doing extra work relative to a current load, e.g. at which the generator maintains the temperature of at least one reefer container 130 at the set temperature. In this way, the total load on the generator, i.e. including the "reefer load" attributed to providing energy to the at least one reefer container 130, is brought within the target load range which includes the target load value. In some cases, the controller 110 may determine a difference between the load on the generator 120 and the lower bound of the target load range for the generator 120 and route an amount of energy corresponding to the determined difference to the power interface 105 (e.g. "surplus" energy) for storage at the at least one reefer container 130.

When the load on the generator 120 is above the target load range, e.g. above the upper bound of the range, the power control system 100 may be configured to control the load such that it falls within the target load range by the controller 110 controlling energy stored at the at least one reefer container 130 via the power interface 105. For example, the at least one reefer container 130 may comprise (thermal) energy that was stored when the load on the generator 120 was previously below the target load range which caused the controller 110 to increase the energy supplied to the power interface 105 for storage at the at least one reefer container 130, e.g. by subcooling the at least one reefer container 130 as described. Thus, when the load on the generator 120 subsequently rises above the target load range, at least some of the stored (thermal) energy stored at the at least one reefer container 130 can be utilised, e.g. by reducing the energy suppled to the at least one reefer container 130, so that the total load on the generator, i.e. including the reefer load, is brought within the target load range including the target load value. In some cases, the controller 110 controls the energy stored at the at least one reefer container 130 by reducing energy supplied to the at least one reefer container 130 via the power interface 105. Reducing the energy supplied to a given reefer container may involve stopping the supply of energy to the given reefer container, e.g. by terminating power supply to the given reefer container via the associated power interface 105. This may be done based on the cargo (e.g. commodity, produce) stored within the at least one reefer container where possible, for example based on cargo data as mentioned above.

The power interface 105 may comprise a device or outlet, e.g. an electrical power point, to which the at least one reefer container 130 is connected for powering the at least one reefer container 130.

Figure 2:
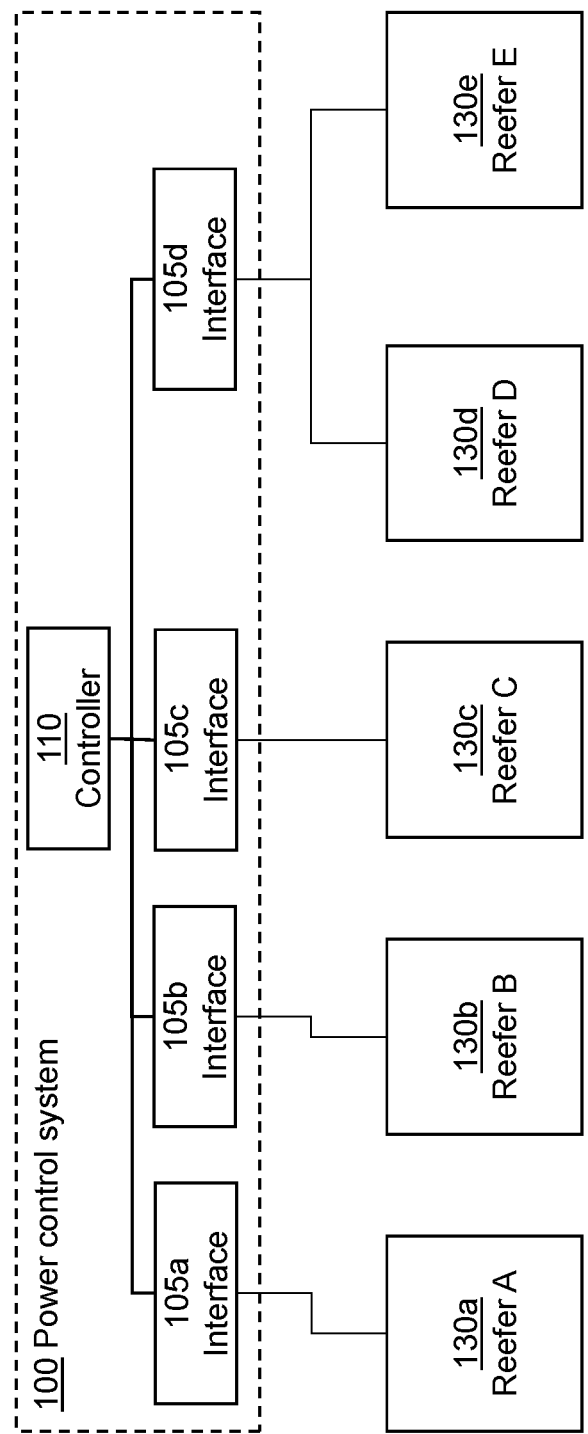

In examples, the power control system 100 includes a plurality of power interfaces (e.g. power interfaces 105a-105d in FIG. 2), like the power interface 105 described above, for supplying a plurality of reefer containers 130 (e.g. reefers 130a-130e in FIG. 2; described further below). For example, each power interface 105 may supply power to a respective reefer container 130 in a one-to-one relationship. Additionally, or alternatively, one or more power interfaces 105 of the plurality of power interfaces may each supply power to plural reefer containers 130 in a one-to-plural relationship.

As described above, the load on the generator 120 can include a reefer load which comprises the energy supplied to the plurality of reefers 130 transportable by, e.g. located on, the container vessel 1. For example, the generator 120 may generate power for supplying to the reefers 130, with the share of the total power generated by the generator 120 (i.e. the total load on the generator 120) attributable to this corresponding to the reefer load. The power control system 100 may therefore be configured to control the generator load such that it falls within the target load range by the controller 110 controlling energy stored at the plurality of reefers 130, via the plurality of power interfaces 105, to reduce the reefer load such that the generator load falls within the target load range. For example, referring to FIG. 1 and considering the case where the at least one reefer 130 comprises a plurality of reefers on the container vessel 1, the load on the generator 120 may be made up of: the reefer load for supplying the plurality of reefers; a thruster load for supplying power to the thrusters 140; a pump load for supplying power to the pumps 150; and a hotel load. Thus, the controller 110 may control (thermal) energy stored at the plurality of reefers 130, via the one or more power interfaces 105, in order to reduce the reefer load while maintaining the thruster, pump, and hotel loads. For example, the reefer load may be reduced, by reducing energy supplied to the reefers, until the load falls within the target load range. In this way, thermal energy that is stored in the reefers (e.g. by previous sub-cooling of the reefers) can be released by changing the respective temperature setting of selected reefers up, while still being below a pre-set maximum temperature (e.g. a "booking setting" set by the bill of laden for the respective cargo carried by the reefer containers). Therefore, the selected reefers will not call for cooling until the reefer temperature approaches the adjusted set temperature, e.g. the respective refrigeration unit of the selected reefers may stop and only use power for internal fan rotation.

As described herein, when the load on the generator 120 is below the target load range, which includes the target load, the controller 110 increases energy supplied to the power interface 105 for storage at the at least one reefer container 130. In this way, the power control system 100 is configured to control the load on the generator 120 such that the load falls within the target load range. For example, the controller 110 may cause more energy generated by the generator 120 to be routed via at least one reefer point supplying power to the at least one reefer. In some cases, energy may be stored at the reefer by "sub-cooling" the at least one reefer. For example, the at least one reefer may operate at a first set temperature and then, when the load is below the target load range, energy is routed by the controller 110 to operate the at least one reefer at a second set temperature where the second set temperature is lower than the first set temperature. The controller 110 may thus increase the energy supplied to the power interface 105 to cool the at least one reefer below a set temperature for the at least one reefer container, when the load on the generator 120 is below the target load range, in order for the power control system 100 to control the load on the generator 120 to fall within the target load range. For example, the controller 110 may cause more energy to be supplied to the at least one reefer container 130, via the power interface 105, to cool the at least one reefer container 130 by at least 5° C. The at least one reefer container 130 may be cooled to a temperature of no less than −35° C. in some cases. In an example, the reefer may have a first set temperature of −18° C. and the controller 110 may cause the sub-cooling of the reefer to a second set temperature of −25° C., i.e. lower than the first set temperature. In some examples, the controller 110 may cause the sub-cooling of the reefer by a predetermined amount, e.g. a predetermined number of degrees Celsius. Sub-cooling the reefer effectively makes the reefer an energy store since energy is not required to refrigerate the reefer for as long as the reefer is sub-cooled below its temperature setting. Thus, the sub-cooled reefer may not have to be actively cooled by its refrigeration unit for a longer amount of time, compared to a reefer that has not been sub-cooled, since the sub-cooled reefer takes longer to warm up. In this way, the at least one reefer can be considered as part of the energy storage onboard the vessel. Sub-cooling the reefer may also not affect the contents of the reefer e.g. spoil the cargo contained therein. For example, operating the reefer at such lower temperatures can cause microbes to be destroyed and help preserve frozen cargo contained within the reefer container.

As described, when the load is below the target load range, the controller 110 may route energy to operate the at least one reefer below the first set temperature. In some examples, the controller 110 may be configured to determine, via input signals e.g. from the power interface 105 and/or a reefer unit controller for the at least one reefer container 130, to start sub-cooling the at least one reefer container 130 below the first set temperature. The input signal may be a wired or wireless signal. In some examples, the input signal may be sent as a "dead man's" system such that controller 110 may be configured to determine an input signal to start sub-cooling the at least one reefer container 130, then the at least one reefer container 130 is returned to normal cooling operation, e.g. if the signal is no longer received.

Figure 5A:
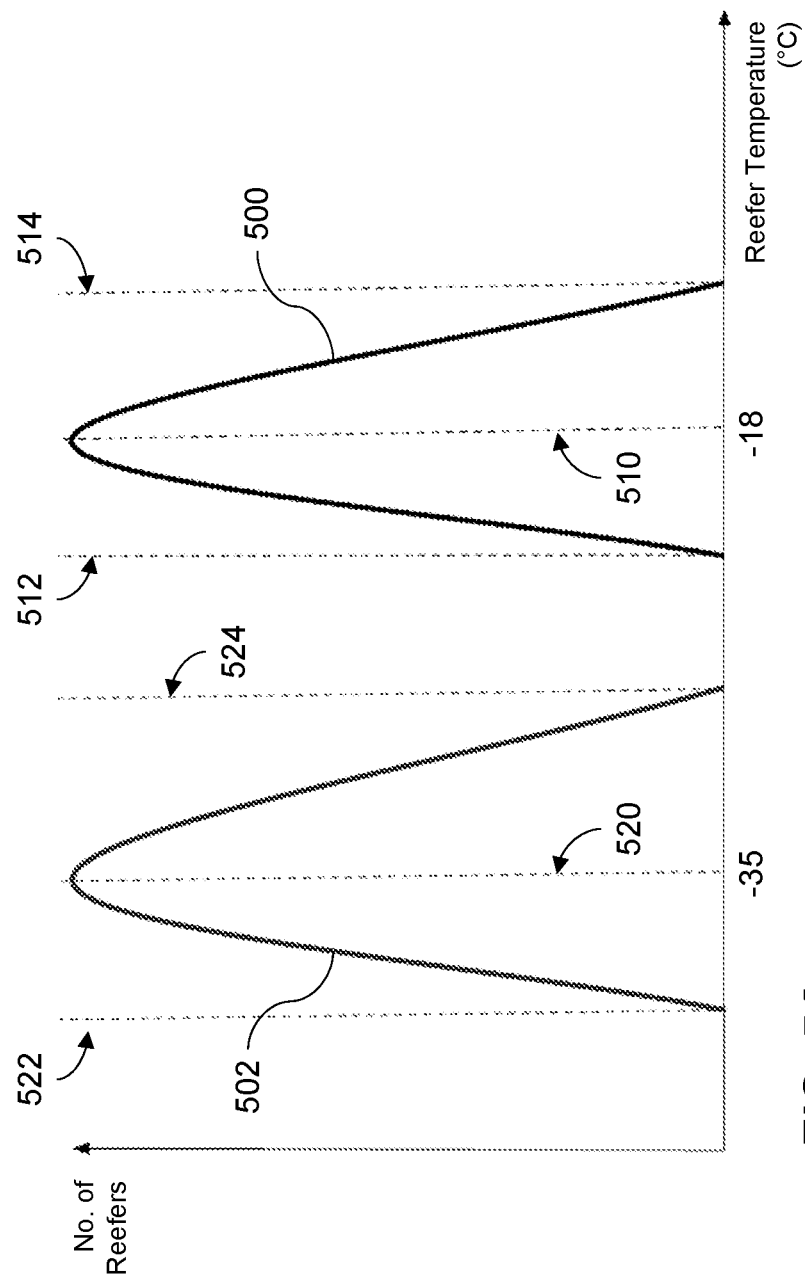
FIGS. 5A to 5C show charts illustrating temperature distributions of reefer containers according to examples.

FIG. 5A shows an example first temperature distribution 500 for a plurality of reefers on a chart with the number of reefers versus their respective temperatures. In the first temperature distribution 500 the reefers are operating according to a first set temperature 510, in this example −18° C. The reefers of the first temperature distribution 500 all lie within a temperature range between a first lower temperature 512 and a first upper temperature 514. For example, the temperature range may be a predetermined set temperature range for the reefers, in other words the set temperature for each reefer may comprise a set temperature range between the first lower temperature 512, e.g. −20° C., and the first upper temperature 514, e.g. −16° C. In some cases, the temperature range between the first lower temperature 512 and the first upper temperature 514 may be provided by a predetermined tolerance about the set temperature, for example a tolerance of +/−2° C. applied to the first set temperature 510 of −18° C. in this example gives the temperature range between −20° C. and −16° C., i.e. between the first lower temperature 512 and the first upper temperature 514. In the example of FIG. 5A, the plurality of reefers is sub-cooled to a second set temperature 520 lower than the first set temperature 510, in this example −35° C. The sub-cooled reefers of the second temperature distribution 502 lie within a temperature range between a second lower temperature 522 and a second upper temperature 524. For example, the first lower and upper temperature limits 512, 514 may have been lowered to the second lower and upper temperature limits 522, 524 respectively. Alternatively, the set temperature for the plurality of reefers may be lowered from the first set temperature 510 (e.g. −18° C.) to the second set temperature 520 (e.g. −35° C.) with the predetermined tolerance kept the same (e.g. +/−2° C.), for example to give the set temperature range between the second lower temperature 522 (e.g. −37° C.) and the second upper temperature 524 (e.g. −33° C.) for the plurality of reefers in the second temperature distribution 502.

Figure 5B:
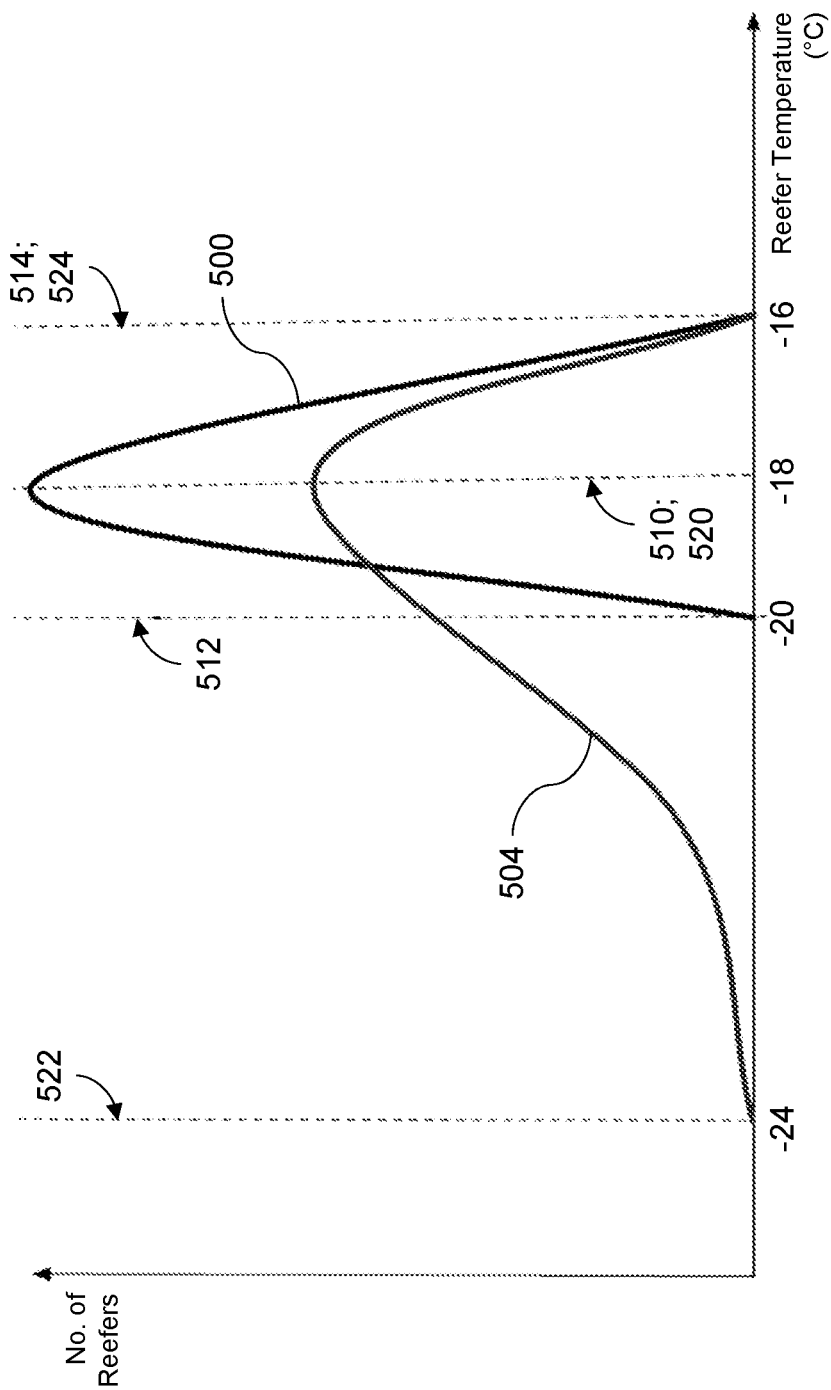

FIG. 5B shows another example in which a plurality of reefers has a first temperature distribution 500 about a first set temperature 510 and between a first lower temperature 512 and a first upper temperature 514. In FIG. 5B, the first temperature distribution 500 is the same as that of FIG. 5A, i.e. the first lower temperature 512 is −20° C., the first upper temperature 514 is −16° C., and the first set temperature 510 is −18° C. As described above, the plurality of reefers represented by the first temperature distribution 500 may have a first set temperature range between the first lower temperature 512 and the first upper temperature 514. In this example, however, subcooling the plurality of reefers involves reducing the lower bound of the first set temperature range, i.e. the first lower temperature 512, without adjusting the first set temperature 510 or the first upper temperature 514 for the plurality of reefers. For example, the second temperature distribution 504 in FIG. 5B shows a second set temperature range for the reefers which has a second set temperature 520 equal to the first set temperature 510 (e.g. −18° C.) and a second upper temperature 524 equal to the first upper temperature 514 (e.g. −16° C.). However, the second lower temperature 522 (e.g. −24° C.) is lower than the first lower temperature 512 (e.g. −20° C.). Thus, in the second temperature distribution 504 of reefers, there are reefers operating at temperatures below the first set temperature range where there were none in the first temperature distribution 500. These reefers are thus subcooled and can thereby store energy, in the form of thermal energy, generated by the generator 120 in order for the generator 120 to operate within the target load range.

In some examples, there is a plurality of reefers 130 that are supplied power by a plurality of power interfaces 105, as previously described. FIG. 2 shows an example where five reefers 130a, 130b, 130c, 130d, 130e are supplied power via a plurality of power interfaces 105a, 105b, 105c, 105d as part of the power control system 100 for the container vessel 1. The controller 110 may thus be configured to select one or more reefers for increasing the energy supplied thereto, via one or more power interfaces 105, when the load on the generator 120 is below the target load range. For example, a subset of the reefers A-E shown in FIG. 2 may be selected by the controller 110 to store energy generated by the generator 120.

In such examples, the controller 110 may select the one or more reefers 130 based on a time elapsed since the supply of energy to the one or more reefers was increased by the controller 110. For example, the controller 110 may select those refers 130 associated with the longest times elapsed since the supply of energy thereto was last increased, e.g. in other words the reefers 130 that have gone the longest without having extra energy supplied to them. In examples, the controller 110 may select the one or more reefers 130 based on a time elapsed since the one or more reefers last performed a refrigeration cycle. For example, the controller 110 may select those reefers 130a, 130b, 130c, 130d, 130e associated with the longest times elapsed since a refrigeration cycle was performed thereby. In other words, the controller 110 may select the one or more reefers 130a, 130b, 130c, 130d, 130e that have gone the longest time without having performed a refrigeration cycle.

The refrigeration cycle may comprise a vapor compression cycle, vapor absorption cycle, gas cycle, or Stirling cycle depending on the type of refrigerator employed by the reefer, for example. In the case of the vapor compression cycle, a circulating working fluid (also called a "refrigerant") travels through a compressor, a condenser, an expansion valve (also called a "throttle valve") and an evaporator (where the refrigerant as a cold liquid-vapor mixture is vaporized by cooling the warmer air from the space being refrigerated) before returning to the compressor inlet to complete the cycle. Thus, a respective time period since the last refrigeration cycle was performed or completed by each reefer 130a, 130b, 130c, 130d, 130e may be tracked, and the controller 110 may select the one or more reefers based on the time periods corresponding to the one or more reefers, for example. In some examples, a number of refrigeration cycles performed by a reefer can be counted, and the controller 110 may select the one or more reefers based on the number of refrigeration cycles performed by the one or more reefers. For example, the controller 110 may prioritize the reefers that have performed the fewest chilling cycles when selecting the one or more reefers 130a, 130b, 130c, 130d, 130e.

Additionally, or alternatively, the controller 110 may select the one or more reefers based on a respective location on the container vessel 1 of the one or more reefers relative to other reefer containers of the plurality of reefer containers 130a, 130b, 130c, 130d, 130e. For example, the controller 110 may prioritize reefers that are located in certain areas on the container vessel 1. For example, the controller 110 may prioritize reefer containers that are surrounded by other reefer containers in the plurality of reefers when selecting the one or more reefers to sub-cool. Such surrounded reefer containers may be more insulated than other reefer containers located closer to the outside of the container vessel, e.g. by the other reefer containers themselves, and so warm more slowly and thus store thermal energy for longer. In another example, the controller 110 may prioritize reefers that are closer to the generator 120 or another defined location on the container vessel 1. Data identifying positions of the reefers may be stored in memory (such as a database) as part of the reefers or part of the container vessel 1. The controller 110 may be configured to receive an indication of the data or the positions directly or indirectly from the memory, for example.

Additionally, or alternatively, the controller 110 may select the one or more reefers based on a type of product contained within the one or more reefers, e.g. relative to other reefers in the plurality of reefer containers 130a, 130b, 130c, 130d, 130e. For example, the controller 110 may actively not select a reefer which contains a product that is not temperature stable. For example, a product that is not temperature stable may deteriorate when exposed to a temperature outside, e.g. below, a specific temperature range. Thus, subcooling, e.g. changing the set temperature of, a reefer containing such a product may risk spoiling the product. The controller 110 may therefore be configured to not select such a reefer when selecting the one or more reefers for increasing the energy supplied thereto. As described, cargo data (e.g. comprising information relating to products contained by the reefer containers to be transported by the container vessel) may be obtainable by the controller 110. For example, the cargo data may be stored in memory (such as a database) that is part of the reefer or part of the container vessel 1, e.g. the memory referred to in the example above. The controller 110 may be configured to receive an indication of the data or the product directly or indirectly from the memory.

Figure 5C:
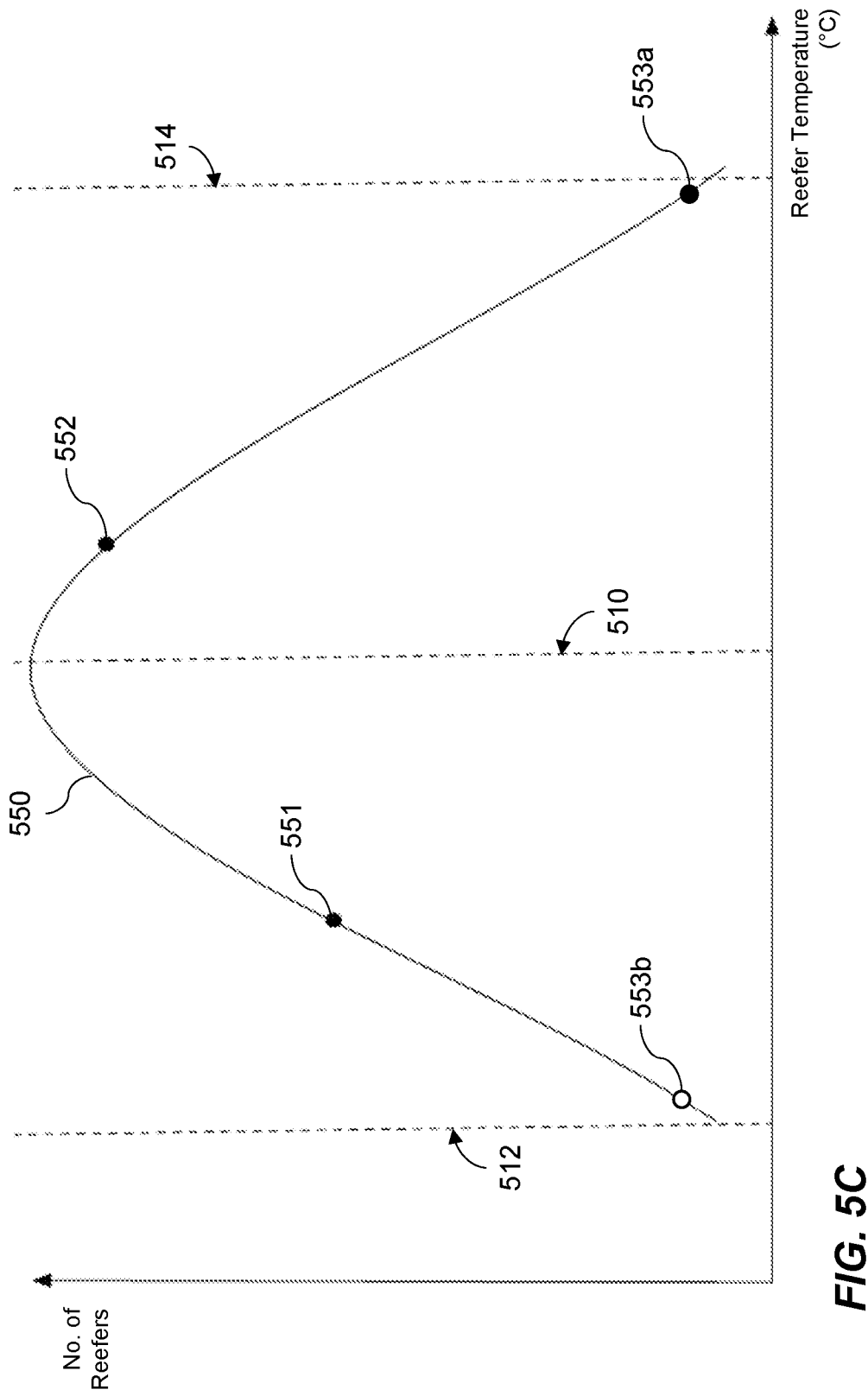

Additionally, or alternatively, the controller 110 may select the one or more reefers based on a current internal temperature of the one or more reefers, e.g. relative to other reefers in the plurality of reefer containers 130a, 130b, 130c, 130d, 130e. For example, the controller 110 may select those reefers which are operating at or below a predetermined temperature, e.g. −10° C. In some cases, the controller 110 may select those reefers which are operating at the highest refrigeration temperatures within a temperature range of a set temperature. The controller 110 may select those reefers which are operating at a refrigeration temperature closest to an upper limit of their respective set temperature range, for example. FIG. 5C shows another example temperature distribution 550 for a plurality of reefers. The reefers operate at a set temperature 510 with a predetermined tolerance that is symmetric about the set temperature 510, giving a set temperature range between a lower temperature 512 and an upper temperature 514. In other examples, the tolerance may be asymmetric about the set temperature 510, e.g. the sub range (of the set temperature range) between the lower temperature 512 and the set temperature 510 may be larger than the sub range between the set temperature 510 and the upper temperature 514, or vice versa. There are three points 551, 552, 553a labelled on the temperature distribution 550 which represent three respective reefers of the plurality of reefers. The reefer operating at a temperature closest to the upper temperature 514 of the set temperature range, represented by point 553a, is selected by the controller 110 for increasing the energy supplied thereto (e.g. to sub-cool the reefer) when the load on the generator 120 is below the target load range, causing the refrigeration temperature of the reefer to drop. The sub-cooled reefer is represented by point 553b, which is operating at a temperature lower than the set temperature 510 for the plurality of reefers and closer to the lower temperature 512 of the set temperature range than most of the plurality of reefers represented in the temperature distribution 550.

Temperature data, indicative of the internal temperature of a given reefer container, may be measured by a temperature sensor that is part of the reefer, for example a thermocouple in the reefer container that is connected to a reefer controller of the given reefer container. Each reefer container may have its own reefer controller, refrigeration unit and temperature sensor(s) where the reefer controller is to only control the individual reefer container, e.g. the refrigeration unit thereof. The controller 110 of the power control system 100 for the container vessel 1 may therefore be configured to receive reefer temperature data, e.g. indicative of the measured reefer temperature for a given reefer container, from the temperature sensor(s) or reefer controller of the given reefer container, for example.

Additionally, or alternatively, the controller 110 may select the one or more reefers based on an external air temperature at the respective locations on the container vessel 1 of the one or more reefers, e.g. relative to other reefer containers in the plurality of reefer containers 130a, 130b, 130c, 130d, 130e. For example, the controller 110 may select those reefers that have the lowest differentials between the respective refrigeration temperatures and the surrounding air temperatures at the respective locations. The air temperature may be measured by the temperature sensor(s) of each reefer container, as described above, or by separate temperature sensors mounted as part of the vessel, for example. For example, a given reefer container may have one or more external temperature sensors arranged to measure the surrounding air temperature of the given reefer container, e.g. in addition to the one or more temperature sensors arranged to measure the internal reefer temperature. The controller 110 may thus be configured to receive air temperature data, e.g. indicative of the measured air temperature surrounding a given reefer container, from the external temperature sensor(s) or reefer controller of the given reefer container, for example.

Additionally, or alternatively, the controller 110 may select the one or more reefers 130 based on a current amount of energy stored at, or being supplied to, the one or more reefers 130. For example, the controller 110 may select those reefers 130 which have the lowest amount of energy already stored thereat, the greatest amount of unused energy storage capacity, and/or the lowest amount of energy being supplied thereto. For example, the controller 110 may obtain dynamic operational data for the plurality of reefer containers 130a, 130b, 130c, 130d, 130e (e.g. as part of the reefer data previously described). The dynamic operational data may indicate an amount of energy being supplied to a given reefer container at a given time to keep the given reefer container at its set temperature, e.g. within its set temperature range. Thus, an operational profile for each reefer may be determined based on the obtained dynamic operational data. The controller 110 may therefore select the one or more reefers 130 based on the dynamic operational data and/or operational profile for the one or more reefers, e.g. relative to the relative to other reefer containers in the plurality of reefer containers 130a, 130b, 130c, 130d, 130e.

Additionally, or alternatively, the controller 110 may select the one or more reefers based on a model type of the one or more reefers, e.g. relative to other reefer containers in the plurality of reefer containers 130a, 130b, 130c, 130d, 130e. The model type of a given reefer may comprise a manufacturer identifier and/or a specific model identifier, for example. These parameters may be accessible to the controller 110 via a database, e.g. a reefer database, which may also store the age of the reefers as another parameter. In examples, an efficiency of a given reefer may be determined based on the specifications (e.g. model type) and dynamic operational data for the given reefer. An expected performance of the given reefer can therefore be determined. The controller 110 may therefore select the one or more reefers based on an efficiency or expected performance of the one or more reefer, e.g. relative to other reefer containers in the plurality of reefer containers 130a, 130b, 130c, 130d, 130e. For example, the controller 110 may select for sub-cooling those reefers 130 that are the most efficient, since those reefers will warm the slowest and require the least energy to keep them sub-cooled. In some examples, the controller 110 may select the one or more reefers based on a coefficient of performance (COP) of the one or more reefer containers, e.g. relative to other reefer containers in the plurality of reefer containers 130a, 130b, 130c, 130d, 130e.

Figure 3B:
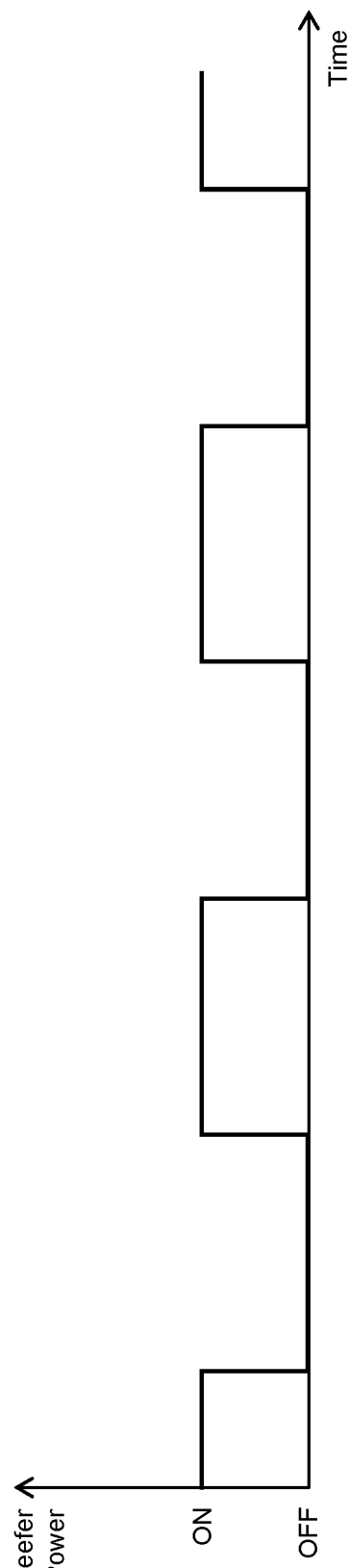

FIG. 3B shows a simplified example where a reefer, e.g. selected from the plurality of reefers 130a, 130b, 130c, 130d, 130e, is powered on and off in order to control the generator load such that it falls within the predetermined range about the target load (shown in FIG. 3A). Switching on the reefer, e.g. such that it is powered to reach a target refrigeration temperature, increases the reefer load—and thus the total load—on the generator 120. Therefore, when the controller determines that the generator load is going to fall, or has fallen, below the target load range—i.e. below the target load value minus Δ in the example of FIG. 3A—the reefer is switched on to increase the reefer load on the generator 120 such that the total generator load falls within the predetermined range of the target load value ±Δ. For example, for a reefer that contains chilled cargo, the controller can cause a 'start' signal to be sent to the reefer and allow the reefer to determine when to switch itself off, e.g. via the respective reefer controller, based on temperature data, for example. Turning off the reefer such that no power is provided thereto decreases the reefer load—and thus the total load—on the generator 120. Therefore, when the controller determines that the generator load is going to rise, or has risen, above the target load range—i.e. above the target load value plus Δ in the example of FIG. 3A—the reefer is switched off to decrease the reefer load on the generator 120 such that the total generator load falls within the predetermined range of the target load value ±Δ.

Figure 4:
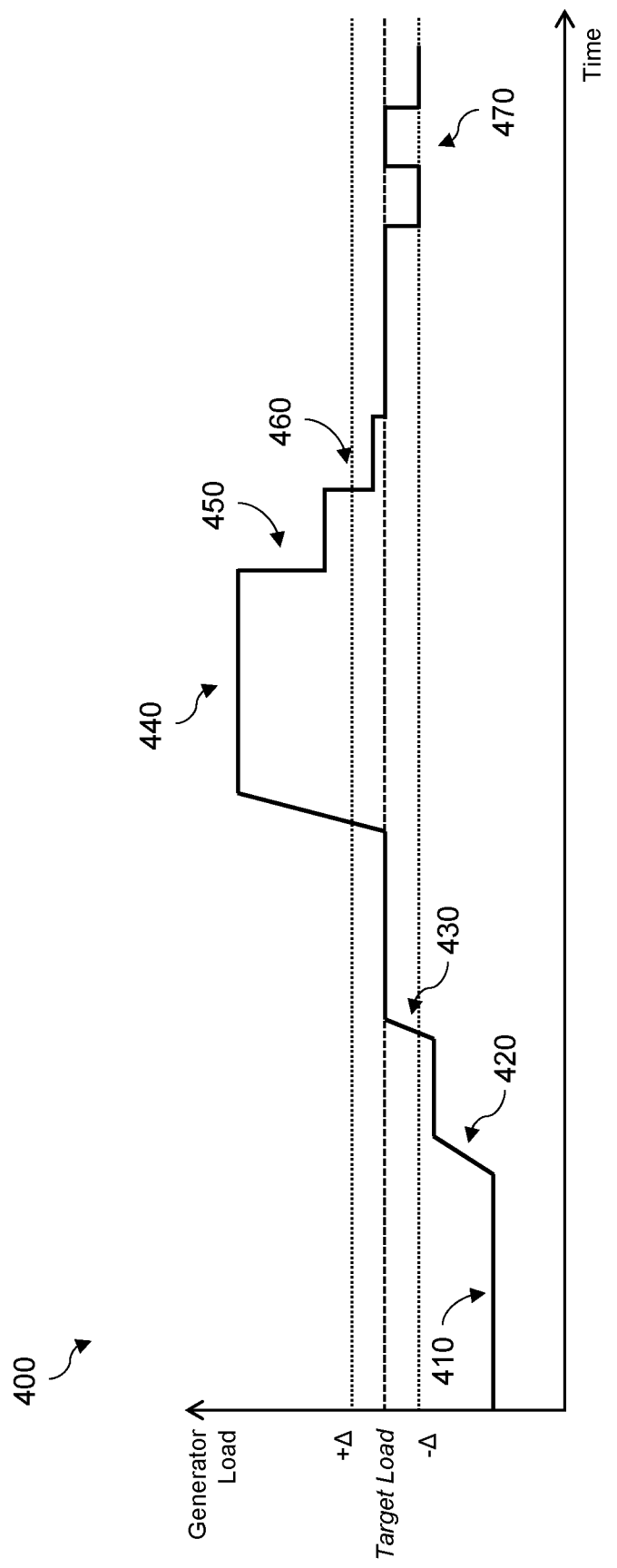
FIG. 4 shows a chart illustrating another example of managing a load on a generator.

FIG. 4 shows an example, corresponding to the example system shown in FIG. 1, wherein the load on the generator 120 is managed by the power control system 100 over time. Specifically, FIG. 4 shows a chart with time on the abscissa (x-axis) and the generator load on the ordinate (y-axis). The target load value for the generator 120 is represented as a dashed line intersecting the ordinate, and the target load range is represented as the range between the dotted lines intersecting the ordinate at −Δ and +Δ about the target load value. At section 410 of the chart, the generator 120 is operating at a load below the target load. At section 420, the generator load is increased by charging a battery 115 during the period of low demand on the generator 120. The battery 115 may be separate to the reefer containers 130 on the container vessel 1 and used to store energy generated by the generator 120 when the load is below the target load range which includes the target load; as shown in FIG. 4.

At section 430, it is determined that the generator load is below the target load and in response the controller 110 sends control signals to one or more power interfaces 105 supplying power to one or more reefers in order to cause sub-cooling of the reefer(s). In some examples, sub-cooling of the reefer(s) may only be allowed where the set temperature for the reefer(s) is below minus five (−5) Celsius. Thus, the controller 110 increases the supply of energy to the power interface 105 for storage at the reefer(s) by sub-cooling the reefer(s). The generator load is thus further increased at section 430 by the controller causing sub-cooling of the one or more reefers, such that the generator load reaches the target load for the generator 120.

At section 440 of the chart, the demand (load) on the generator 120 has risen above the target load. In some examples, one or more batteries (e.g. the battery 115) may be used to cope with the period of high demand and/or another generator may be brought online. At section 450, the generator load is reduced by stopping charging of the battery 115 which was begun at section 420 previously. Selected reefers are sequentially switched off during section 460 until the generator load is reduced to the target load. In other examples, a set temperature range of one or more selected reefers may be adjusted, e.g. widened, thereby delaying the selected reefer(s) starting in order to reduce the generator load without switching the reefers off. As previously described, the reefers may be prioritized based on one or more possible factors to determine the order in which the reefers are selectively switched off. Through section 470, power switching of one or more reefers on the container vessel 1 is used to control the generator load such that it falls within the predetermined range, while also maintaining a refrigeration temperature (e.g. within a predetermined range, in order for the refrigerated cargo not to spoil).

Figure 6:
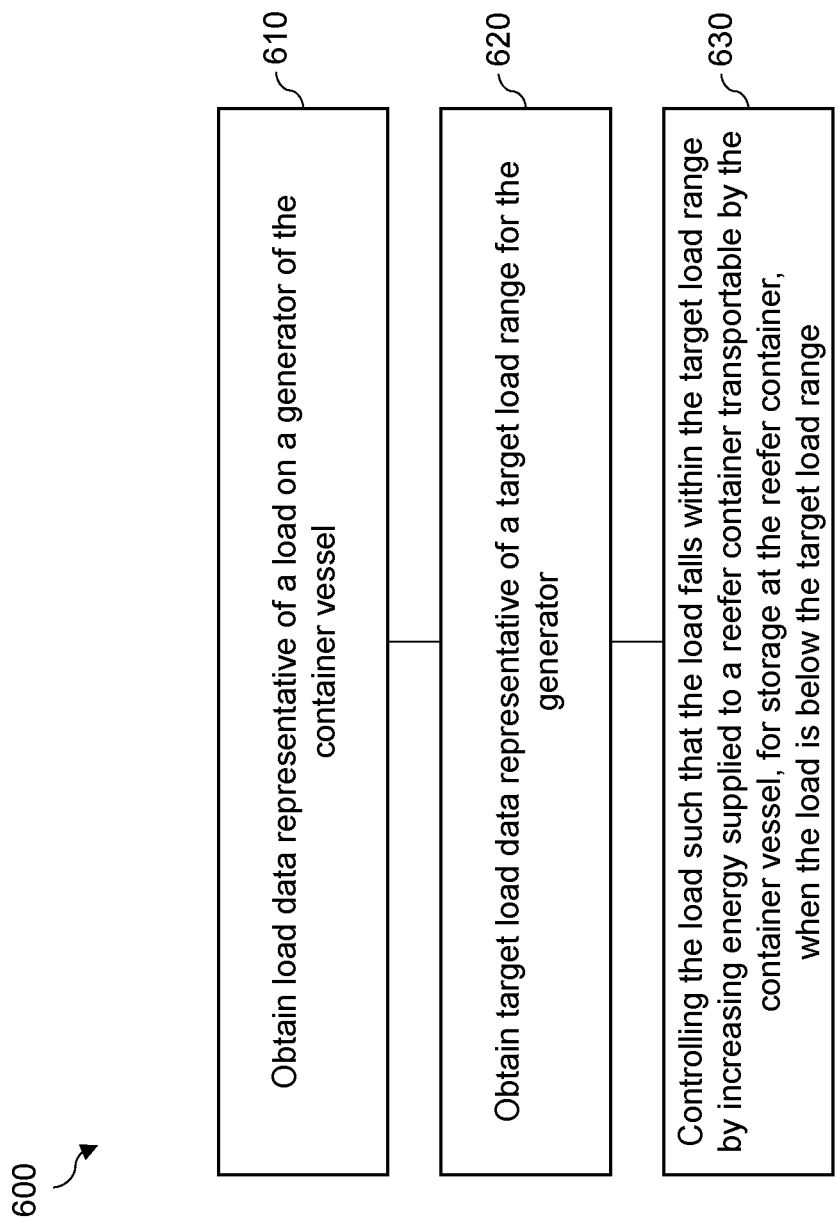
FIG. 6 shows a flow chart illustrating a method for a power control system of a marine vessel according to an example.

FIG. 6 shows a method 600 for a power control system of a container vessel 1 according to an example. The method 600 comprises three blocks 610, 620 and 630.

At block 610, load data representative of a load on the generator is obtained. This for example may comprise receiving, retrieving or determining an amount of power that the generator is currently outputting, e.g. to components on the container vessel 1. In some examples, this may involve accumulating all partial loads currently on the generator, e.g. each partial load attributable to a different component of the vessel being powered by the generator. The load data may be obtained "live", e.g. while the generator is operating, to indicate a current load status for the generator. In examples, the load data may comprise a timeseries of power values recorded at predetermined time intervals.

At block 620, target load data representative of a target load range for the generator is obtained. This for example may comprise receiving, retrieving or determining a predetermined range of power values that the generator is intended to operate at. In examples, the target load data may be retrieved from a memory, e.g. the same database which stores the load capacities of the generators on board the container vessel 1. In other examples, the target load range may be based on an efficiency of the generator, or of the engine component of the generator. For example, the target load range may be computed to be a load range on the generator that provides a peak efficiency of the generator (or specifically the engine component thereof). Such a determination may be made per generator such that each generator has its own peak efficiency and associated target load range. In other examples, the target load range is determined based on an obtained target load value. For example, the target load value may be a pre-set value that does not change by which generator is being managed. For example, the target load may be set at 85% of the maximum generator load, regardless of which specific generator is being managed.

In some examples, capacity data representative of a maximum load capacity of a generator is also obtained. This may involve receiving, retrieving or determining a power value indicative of the maximum amount of power that the generator can output. For example, data storage, such as a database, may store the load capacities of the generators onboard the container vessel 1, and the capacity data may be obtained for the generator from this data storage.

At block 630, when the load is below the target load range, the load is controlled such that the load falls within the target load range by increasing energy supplied to a reefer container transportable by the container vessel for storage at the reefer container.

In examples, the load is controlled to fall within the target load range by controlling energy stored at the reefer container when the load is above the target load range. For example, by reducing the reefer load, e.g. utilising energy previously stored as thermal energy at the reefer containers when the generator operated at a load below the target load range, the power demands of the components supplied by the generator can be met while the total load on the generator is reduced. As described, controlling energy stored at the reefer container(s), e.g. via a power interface arranged to supply power to the reefer container(s), may comprise reducing the amount of energy supplied to the reefer container(s). For example, the amount of energy being routed to the power interfaces for supplying power to the one or more reefers may be reduced while keeping the operating temperature of the one or more reefers within the set temperature range for the one or more reefers, e.g. by selecting reefers that have been sub-cooled to reduce the amount of energy supplied thereto. This can reduce the energy demand of the one or more reefers on the generator and so can contribute to the total load of the generator being brought within the target load range about the target load value. In certain cases, reducing energy supplied to a given reefer involves stopping the supply of energy to the given reefer, e.g. switching off the power supply to the given reefer. This might be done at the power interface for the given reefer, for instance, or at the power controller which controls the power supply routed to the one or more power interfaces.

As described in examples, controlling the load such that it falls within the predetermined (or "target") load range may be done by increasing, when the load is below the target load range, energy supplied to a plurality of reefer containers for storage at the plurality of reefers. Thus, when the generator is operating at a load below the target load range, the deficit can be at least partially reduced by increasing the reefer load on the generator. Increasing the reefer load, e.g. by routing more energy to the one or more power interfaces arranged to supply power to the reefers, can in turn increase the total load on the generator so that it falls within the target load range for the generator.

At other times, controlling the load to fall within the target load range may be done by reducing the reefer load. For example, when the generator is operating at a load which is above the target load range, the surplus can be at least partially reduced by decreasing the reefer load on the generator. Decreasing the reefer load, e.g. by routing less energy to the reefers that have been sub-cooled, can in turn decrease the total load on the generator until it falls within the target load range. In this way, advantage can be taken of the effective "thermo battery" provided by the one or more reefers.

In some cases, the generator can provide energy to multiple reefers, e.g. via one or more power interfaces, as described in examples above. In such cases, the method 600 may involve selecting, when the generator load is below the target load range, one or more reefers from the plurality of reefers for increasing the energy supplied thereto. An energy surplus between the target load and a current generator load can thus be at least partially utilised by selecting one or more reefers for increasing the energy supplied thereto, e.g. via the corresponding power interface(s). The selection can be based on a time elapsed since the energy supply for the one or more reefers was last increased, a respective location on the container vessel 1 of the one or more reefers, a type of product contained within the one or more reefer containers, a model type of the one or more reefer containers, a current amount of energy being supplied to the one or more reefer containers, a current internal temperature of the one or more reefer containers, and/or an external air temperature at the location on the container vessel of the one or more reefer containers, relative to other reefer containers of the plurality of reefer containers, as described above in more detail.

The above embodiments are to be understood as illustrative examples. Further embodiments are envisaged. For example, many cases are described that involve the use of one or more reefers. However, cargo onboard the container vessel may include battery electric vehicles, motor vehicles with an automotive battery, electrical appliances, electronic devices, batteries, heaters, or other electrical equipment, which may serve as an energy store when the generator load is below the target load range in envisaged embodiments. For example, one or more power interfaces may supply electrical power to such cargo types (e.g. a charging point for an electrical vehicle) and the controller of the power control system may route energy produced by the generator to the one or more power interfaces for storage at the cargo (e.g. to charge the electrical vehicle). When the load on the generator is above the target load range, the controller may cause reduction of energy supplied to the cargo, via the power interfaces, in order to lower the generator load toward the target load range for the generator.

It should be noted that, although each example has been described individually, features from each example may be combined, features of one example may be combined with features of one or more other examples. Examples of the present invention have been discussed. However, it will be appreciated that variations and modifications may be made to the examples described, without departing from the scope of the invention as defined by the appended claims.

What is claimed is:

1. A power control system for a container vessel, the power control system comprising:
   a power interface for supplying energy to at least one reefer container transportable by the container vessel;
   a controller configured to obtain:
      load data representative of a load on a generator of the container vessel; and target load data representative of a target load range for the generator;

wherein the power control system is configured to control the load such that the load falls within the target load range by the controller increasing energy supplied to the power interface for storage at the at least one reefer container, when the load is below the target load range.

2. The power control system according to claim 1, wherein the controller increasing the energy supplied to the power interface for storage at the at least one reefer container is to cool the at least one reefer container below a set temperature for the at least one reefer container.

3. The power control system according to claim 1, wherein the controller increasing the energy supplied to the power interface for storage at the at least one reefer container is to cool the at least one reefer container by at least 5 degrees Celsius, optionally to a temperature of no less than −35 degrees Celsius.

4. The power control system according to claim 1, wherein the power control system is configured to control the load such that the load falls within the target load range by the controller reducing energy supplied to the at least one reefer container via the power interface, when the load is above the target load range.

5. The power control system according to claim 4, wherein reducing the energy supplied to the at least one reefer container comprises stopping a supply of energy to the at least one reefer container.

6. The power control system according to claim 1, comprising a plurality of power interfaces, including the power interface, for supplying energy to a plurality of respective reefer containers, wherein the load on the generator includes a reefer load comprising energy supplied to the plurality of reefer containers via the plurality of power interfaces, and wherein the power control system is configured to control the load such that the load falls within the target load range by the controller adjusting the reefer load when the load is outside the target load range.

7. The power control system according to claim 6, wherein the controller is configured to select one or more reefer containers from the plurality of reefer containers for adjusting the energy supplied thereto, via one or more power interfaces of the plurality of power interfaces.

8. The power control system according to claim 7, wherein the controller is configured to select the one or more reefer containers based on at least one of the following criteria, relative to other reefer containers in the plurality of reefer containers:

a respective location on the container vessel of the one or more reefer containers;

a type of product contained within the one or more reefer containers;

a model type of the one or more reefer containers;

an amount of energy being supplied to the one or more reefer containers;

a current internal temperature of the one or more reefer containers;

a coefficient of performance of the one or more reefer containers; and an external air temperature at the location on the container vessel of the one or more reefer containers.

9. A power distribution system comprising:
the power control system according to claim 1; and
the generator.

10. A container vessel comprising:
the power control system according to claim 1.

11. A power controller for a container vessel, configured to obtain:

load data representative of a load on a generator of the container vessel; and target range data representative of a target load range for the generator;

wherein the controller is configured to control the load such that the load falls within the target load range by:
determining when the load is below the target load range; and
based on the determining, increasing an amount of energy supplied to a power interface, for supplying energy to at least one reefer container of the container vessel, for storage at the at least one reefer container.

12. The power controller according to claim 11, wherein the power controller increasing the amount of energy supplied to the power interface for storage at the at least one reefer container is to cool the at least one reefer container below a set temperature for the at least one reefer container, wherein the power controller is configured to control the load such that the load falls within the target load range by causing a reduction in energy supplied to the at least one reefer container via the power interface when the load is above the target load range.

13. A method for operating a power control system of a container vessel, the method comprising:

obtaining load data representative of a load on a generator of the container vessel;

obtaining target load data representative of a target load range for the generator; and when the load is below the target load range, controlling the load such that the load falls within the target load range by increasing energy supplied to a reefer container transportable by the container vessel, for storage at the reefer container.

14. The method according to claim 13, wherein increasing the energy supplied to the reefer container is to cool the reefer container below a set temperature for the reefer container.

15. The method according to claim 13, wherein increasing the energy supplied to the reefer container is to cool the reefer container by at least 5 degrees Celsius, optionally to a temperature of no less than −35 degrees Celsius.

16. The method according to claim 13, comprising controlling the load such that the load falls within the target load range by reducing energy supplied to the reefer container, when the load is above the target load range.

17. The method according to claim 16, wherein the reducing the energy supplied to the reefer container comprises stopping a supply of energy to the reefer container.

18. The method according to claim 13, comprising controlling the load such that the load falls within the target load range by increasing, when the load is below the target load range, energy supplied to a plurality of reefer containers, comprising the reefer container, for storage at the plurality of reefer containers, wherein the load on the generator includes a reefer load comprising energy supplied to the plurality of reefer containers, the method comprising controlling the load such that the load falls within the target load range by adjusting the reefer load when the load is outside the target load range.

19. The method according to claim 18, comprising selecting one or more reefer containers, from the plurality of reefer containers, for adjusting the energy supplied thereto.

20. The method according to claim 19, comprising selecting the one or more reefer containers based on at least one of the following criteria, relative to other reefer containers of the plurality of reefer containers:
- a respective location on the container vessel of the one or more reefer containers;
- a type of product contained within the one or more reefer containers;
- a model type of the one or more reefer containers;
- a current amount of energy being supplied to the one or more reefer containers;
- a current internal temperature of the one or more reefer containers;
- a coefficient of performance of the one or more reefer containers; and
- an external air temperature at the location on the container vessel of the one or more reefer containers.

\* \* \* \* \*